United States Patent
Unno (10) Patent No.: US 9,262,399 B2
(45) Date of Patent: Feb. 16, 2016

(54) ELECTRONIC DEVICE, CHARACTER CONVERSION METHOD, AND STORAGE MEDIUM

(71) Applicant: CASIO COMPUTER CO., LTD., Tokyo (JP)

(72) Inventor: Shunsuke Unno, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/482,345

(22) Filed: Sep. 10, 2014

(65) Prior Publication Data

US 2015/0081278 A1    Mar. 19, 2015

(30) Foreign Application Priority Data

Sep. 13, 2013   (JP) .................................. 2013-191068

(51) Int. Cl.
*G06F 17/20*   (2006.01)
*G06F 17/27*   (2006.01)

(52) U.S. Cl.
CPC .................................. *G06F 17/276* (2013.01)

(58) Field of Classification Search
CPC ....... G06F 17/20; G06F 17/21; G06F 17/212; G06F 17/22; G06F 17/27; G06F 17/2705; G06F 17/2785; G06F 17/2795
USPC .................................... 704/9, 1, 3, 7, 10, 257
See application file for complete search history.

(56) References Cited

U.S. PATENT DOCUMENTS

| | | | | |
|---|---|---|---|---|
| 2007/0285397 A1* | 12/2007 | LaPointe | ............... | G06F 3/0236 345/169 |
| 2009/0248679 A1* | 10/2009 | Kikuchi | ............. | G06F 17/3097 |
| 2010/0131900 A1* | 5/2010 | Spetalnick | ............ | G06F 17/276 715/825 |
| 2011/0202836 A1* | 8/2011 | Badger | ................. | G06F 3/0237 715/702 |
| 2012/0254802 A1* | 10/2012 | Tinkler | ............... | G06F 17/2735 715/830 |

FOREIGN PATENT DOCUMENTS

JP       2006-301693 A      11/2006

OTHER PUBLICATIONS

Office Action dated Aug. 4, 2015 in Application No. 2013-191068 from Japan Patent Office.
"Wnn8 for AIX User's Manual", vol. 1, Japan, IBM Japan, Ltd., Sep. 30, 2005, pp. 1-4, 1-8, 1-9, 3-4, 3-5, 4-2.

\* cited by examiner

*Primary Examiner* — Qi Han
(74) *Attorney, Agent, or Firm* — Scully, Scott, Murphy & Presser, PC

(57) ABSTRACT

An electronic device includes a processor configured to execute: accepting a character input; causing a display module to display a character or a character string, which has been input by the character input; causing the display module to display a plurality of words which are conversion candidates corresponding to the input character or character string; causing the display module to display, responding to designation by a user of a word of the plurality of words which are conversion candidates, at least one synonym corresponding to the designated word; and causing the display module to display, responding to selection by the user of a synonym of the displayed at least one synonym, the selected synonym in place of the input character or character string.

18 Claims, 5 Drawing Sheets

| WORD | NUMBER OF TIMES |
|---|---|
| ... | ... |
| trick | 3 |
| ... | ... |
| benefit | 1 |
| ... | ... |
| get angry | 4 |
| ... | ... |

| WORD | NUMBER OF TIMES | SYNONYM |
|---|---|---|
| trick | 3 | deceive, cheat, ... |
| get angry | 4 | offend, resent, ... |
| ... | ... | ... |

ELECTRONIC DEVICE, CHARACTER CONVERSION METHOD, AND STORAGE MEDIUM

CROSS-REFERENCE TO RELATED APPLICATIONS

This application is based upon and claims the benefit of priority from prior Japanese Patent Application No. 2013-191068, filed Sep. 13, 2013, the entire contents of which are incorporated herein by reference.

BACKGROUND OF THE INVENTION

1. Field of the Invention

The present invention relates to an electronic device configured to execute a character conversion process of converting input characters in order to create a sentence, etc., a character conversion method, and a storage medium.

2. Description of the Related Art

An information terminal apparatus, such as a personal computer, a mobile phone or a tablet terminal, is equipped with an application program which manages a character input process for creating a sentence. This character input process program includes a prediction conversion function for estimating, when a character input from a keyboard has been started, a word or an idiom, which a user wishes to input, and displaying a candidate character string.

A conventional character input apparatus comprises a prediction conversion function, which starts an application program of, e.g., e-mail, when a television broadcast is being received, and preferentially displays, if a character is input, a conversion candidate relating to the content of the television broadcast (Jpn. Pat. Appln. KOKAI Publication No. 2006-301693).

The conventional prediction conversion function of input characters is such that a word or an idiom, which agrees with input characters or agrees with a first input character, is searched from pre-prepared dictionary data or past input history data, and is displayed as a conversion candidate. However, when a user wishes to use, for a sentence to be created, a wording that is not usual or an expression that is different from a usual one, there is a case in which the user cannot find a conversion candidate which he/she wishes to use.

The present invention has been made in consideration of the above problem, and an object of the invention is to provide a character conversion apparatus which can cause synonyms to be also displayed as conversion candidates when prediction conversion is performed in response to a character input, and also provide a character conversion method and a storage medium.

BRIEF SUMMARY OF THE INVENTION

An electronic device according to the present invention includes a processor configured to execute: accepting a character input; causing a display module to display a character or a character string, which has been input by the character input; causing the display module to display a plurality of words which are conversion candidates corresponding to the input character or character string; causing the display module to display, responding to designation by a user of a word of the plurality of words which are conversion candidates, at least one synonym corresponding to the designated word; and causing the display module to display, responding to selection by the user of a synonym of the displayed at least one synonym, the selected synonym in place of the input character or character string.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the invention will be described hereinafter with reference to the accompanying drawings.

Figure 1:
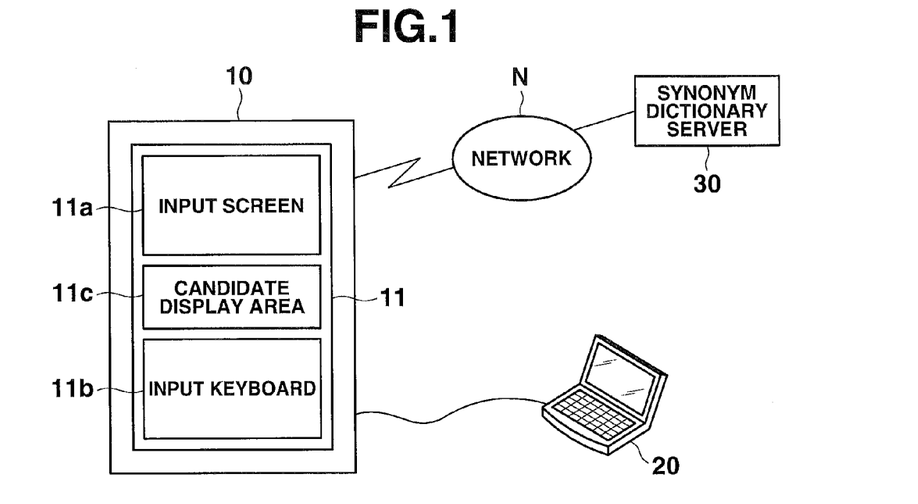
FIG. 1 is a view illustrating a configuration of a character input system using a tablet terminal 10 according to an embodiment of a character conversion apparatus of the invention.

FIG. 1 is a view illustrating a configuration of a character input system using a tablet terminal 10 according to an embodiment of a character conversion apparatus of the invention.

Figure 2:
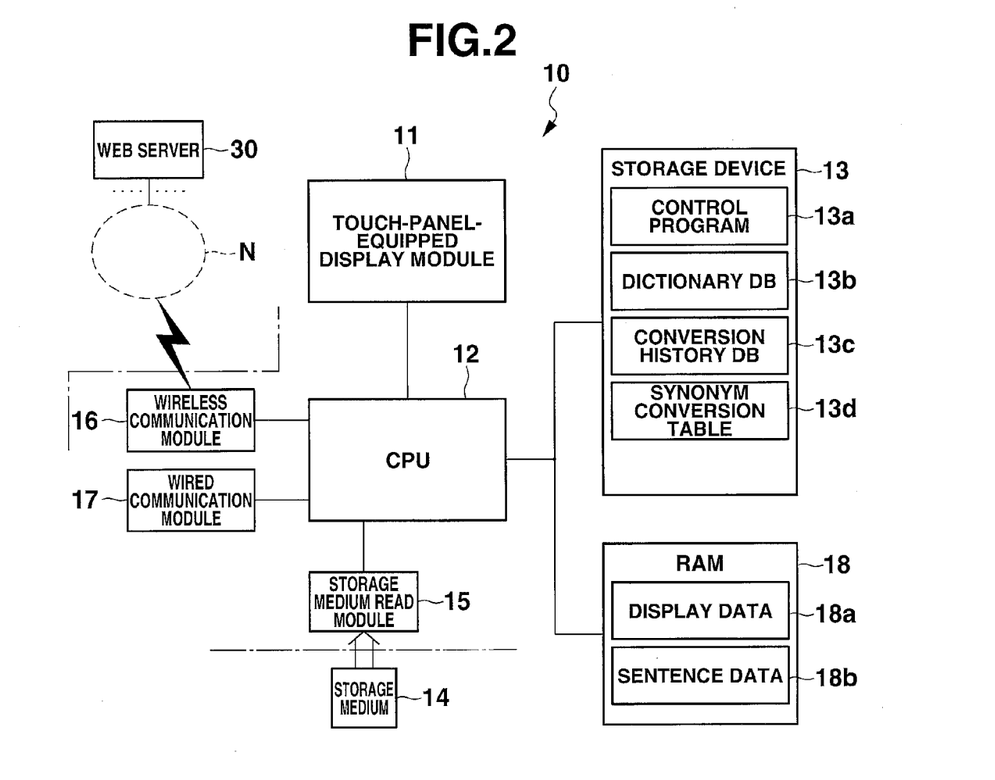
FIG. 2 is a block diagram illustrating a configuration of an electronic circuit of the tablet terminal 10.

FIG. 2 is a block diagram illustrating a configuration of an electronic circuit of the tablet terminal 10.

The character input system includes the tablet terminal 10 which is operated by a user. A Web server (a synonym dictionary server in this case) 30 on a network N is connected to the tablet terminal 10 via a wireless communication module 16, or an electronic dictionary 20 is connected to the tablet terminal 10 via a wired communication module 15, where necessary.

For example, when a sentence of e-mail is to be created, a character input screen 11a is displayed on a touch-panel-equipped display module 11 of the tablet terminal 10. If an input of characters is instructed by the user, a keyboard (soft keyboard) 11b of the hiragana syllabary or alphabet is displayed under the character input screen 11a.

If an arbitrary character of the keyboard 11b is touched, the touched character is displayed on the character input screen 11a as an unfinalized character. At this time, a character string of a conversion candidate corresponding to the input character is generated, and the character string of the conversion candidate is displayed on a candidate display area 11c which is located between the character input screen 11a and the input keyboard 11b.

Incidentally, the electronic dictionary 20 and synonym dictionary server 30 include dictionary databases of synonyms which are not included in a dictionary database 13b of the tablet terminal 10.

In the electronic circuit of the tablet terminal 10, a CPU 12 functioning as a computer is provided.

The CPU 12 controls the operations of respective components according to a terminal control program 13a prestored in a storage device 13, with a RAM 18 being used as a work memory. Incidentally, the terminal control program may be read in the storage device 13 from an external storage medium 14, such as a memory card, via a storage medium read module 15, or may be downloaded and read in via the wireless communication module 16 from the Web server (a program server in this case) 30 which is set up on the communication network N such as the Internet, or may be read in from an external information device via the wired communication module 17.

As the terminal control program 13a stored in the storage device 13, in addition to the system program for managing the control of the entirety of the terminal, application programs for managing various processes, such as a mail process, a table process and a video/audio multimedia process, are stored. In the meantime, a character input function included in various application programs operates in association with a prediction conversion function that is to be described in the embodiment.

In the storage device 13, the dictionary database 13b, a conversion history database 13c and a synonym conversion database 13d are stored.

In the dictionary database 13b, basic dictionary data, such as a Japanese dictionary, an English-Japanese dictionary and a Japanese-English dictionary, are stored. Each dictionary data is stored such that each entry (word) and explanatory information, which corresponds to the entry, are associated.

Figure 3:
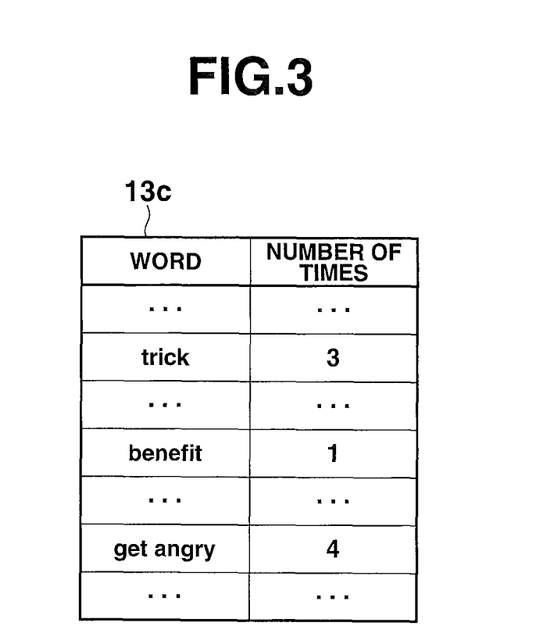
FIG. 3 is a view illustrating the content of a conversion history database 13c which is stored in the tablet terminal 10.

FIG. 3 is a view illustrating the content of the conversion history database 13c which is stored in the tablet terminal 10.

In this conversion history database 13c, a word, which was selected as a conversion character string from among words or idioms (hereinafter, "idiom" is included in the meaning of "word", and each of "word" and "idiom" may be referred to as "word") of conversion candidates displayed on the candidate display area 11c in the character input process at a time of creating a sentence, etc., and the number of times of selection of this selected word, are associated and stored.

Figure 4:
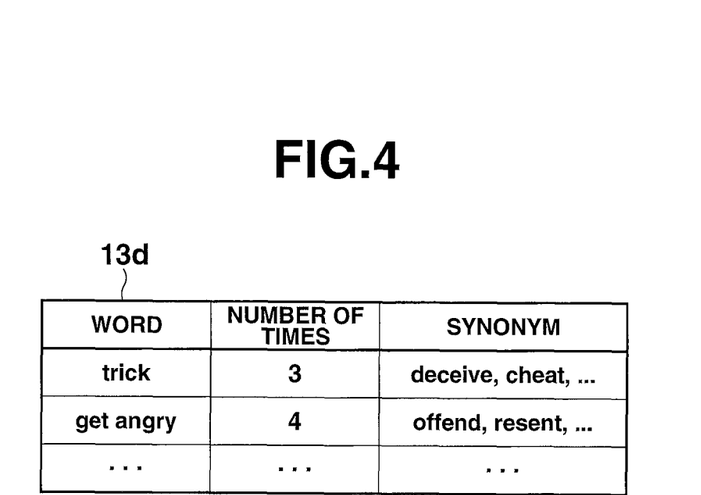
FIG. 4 is a view illustrating the content of a synonym conversion table 13d which is stored in the tablet terminal 10.

FIG. 4 is a view illustrating the content of the synonym conversion table 13d which is stored in the tablet terminal 10.

The synonym conversion table 13d stores synonyms corresponding to frequently used words among the words stored in the conversion history database 13c, the synonyms being read out from the synonym dictionary included in the external electronic dictionary 20 or from the synonym dictionary server 30 on the network N.

The RAM 18 includes a display data memory 18a and a sentence data memory 18b.

The display data memory 18a stores display data which is to be displayed on the touch-panel-equipped display module 11.

The sentence data memory 18b stores sentence data which was input to the character input screen 11a.

In this tablet terminal 10, the CPU 11 controls the operations of the respective circuit components according to instructions of various processes described in the terminal control program 13a, and software and hardware operate in cooperation. Thereby, the character input function, which will be described in the following operational description, is realized.

Next, the operation of the tablet terminal 10 is described.

Figure 5:
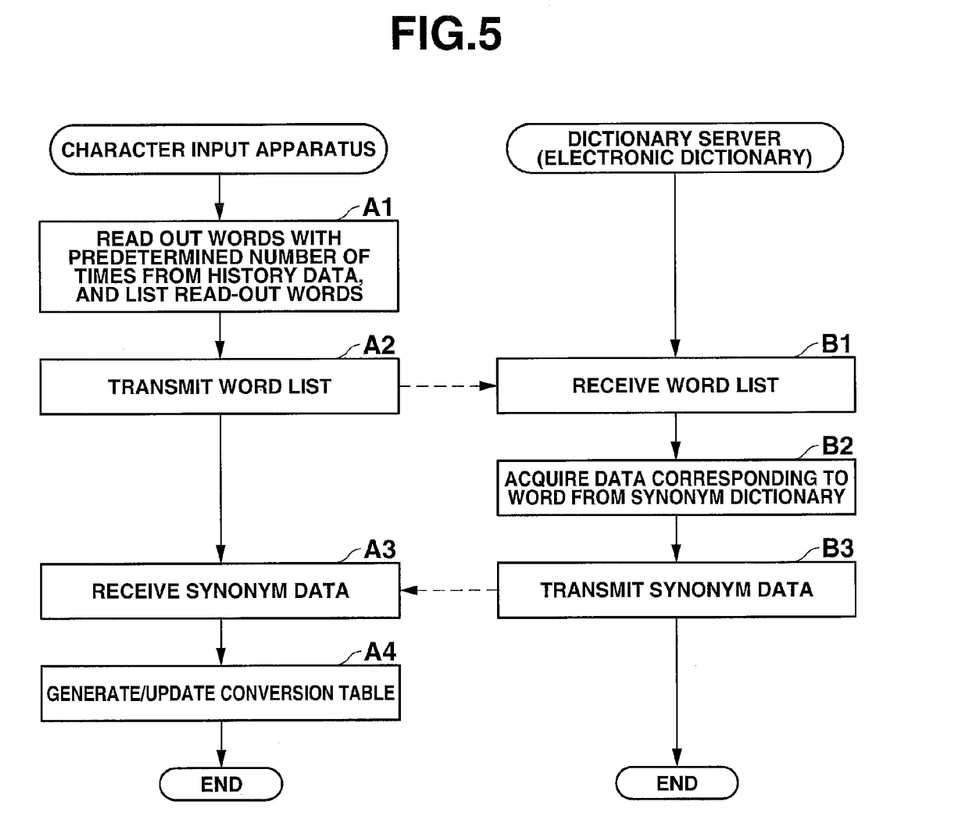
FIG. 5 is a flowchart illustrating a synonym acquisition process between the tablet terminal 10 in the character input system and an external synonym dictionary server 30 or electronic dictionary 20.

FIG. 5 is a flowchart illustrating a synonym acquisition process between the tablet terminal 10 and the external synonym dictionary server 30 or electronic dictionary 20.

In this synonym acquisition process, to start with, in the tablet terminal (character conversion apparatus) 10, those words among the words stored in the conversion history database 13c (see FIG. 3), which have been selected as conversion characters a predetermined number of times (twice in this case) or more, are read out and listed (step A1). This step may be executed after a sentence creation process corresponding to various application programs has been performed, or may be executed at predetermined time intervals. In the case of FIG. 3, the words "trick" and "get angry" are read out and listed. The created word list is transmitted to the synonym dictionary server 30 on the communication network N via the wireless communication module 16 (step A2). Incidentally, the destination of transmission may be the electronic dictionary 20.

In the synonym dictionary server 30, if the word list has been received (step B1), synonyms corresponding to each word in the word list are acquired from the synonym dictionary possessed by the synonym dictionary server 30 (step B2). For example, data "deceive, cheat, . . . " of synonyms corresponding to the received word "trick" are acquired, and "offend, resent, . . . " corresponding to the received word "get angry" are acquired. In the present invention, synonyms include words having substantially the same meaning and words having similar meanings.

Then, the synonym data acquired from the synonym dictionary is transmitted to the tablet terminal 10 that is the transmission source of the word list (step B3).

In the tablet terminal 10, if the data of synonyms transmitted from the synonym dictionary server 30 has been received (step A3), the data of synonyms is associated with each word of the word list, and the synonym conversion table 13d, as shown in FIG. 4, is newly generated, or the already stored synonym conversion table 13d is updated by the received data (step A4).

By this synonym acquisition process, the tablet terminal 10 can have the synonym conversion table 13d which corresponds to words, which were selected as conversion characters in the past a predetermined number of times or more, that is, words frequently used in sentences, without incorporating a synonym dictionary with a large volume of data in the dictionary database 13b.

Figure 6:
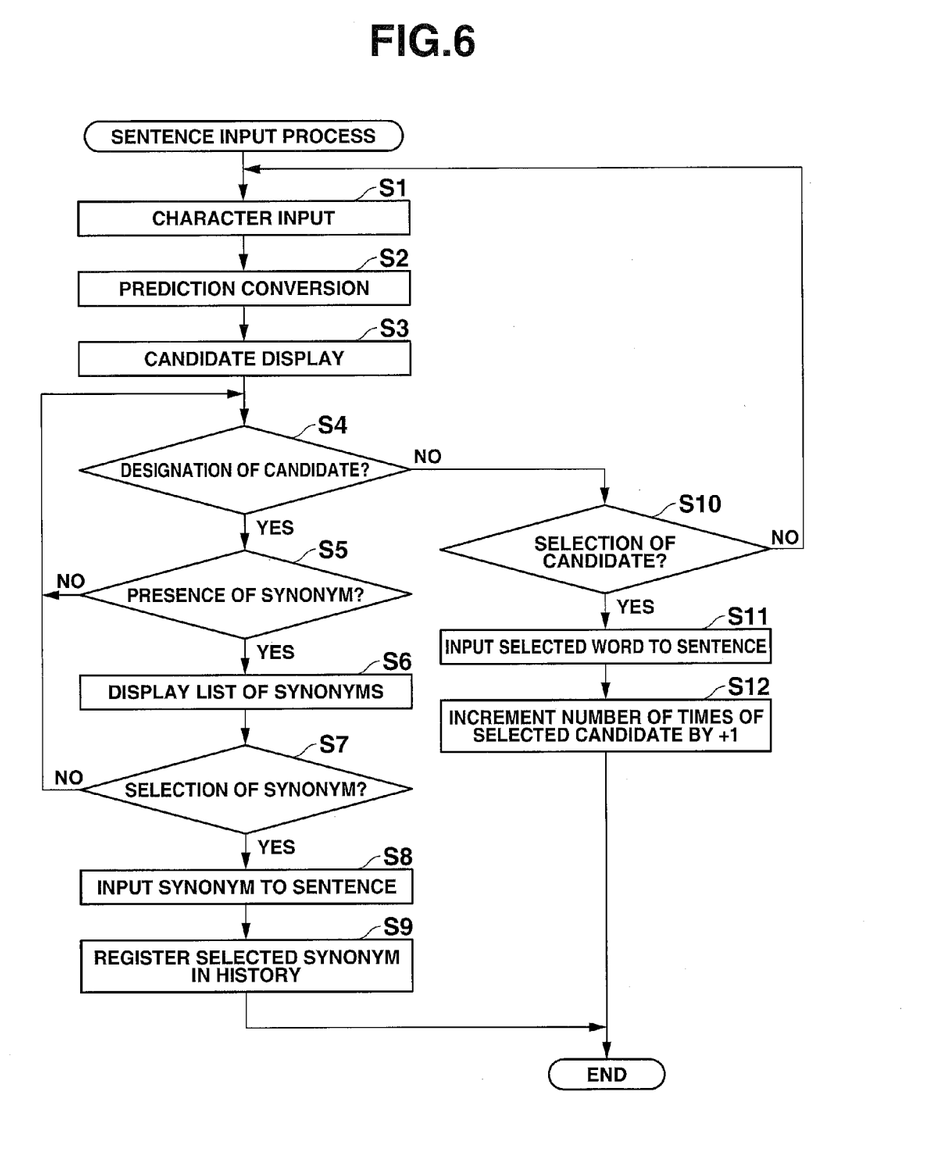
FIG. 6 is a flowchart illustrating a sentence input process by the tablet terminal 10.

FIG. 6 is a flowchart illustrating a sentence input process by the tablet terminal 10.

Figure 7A:
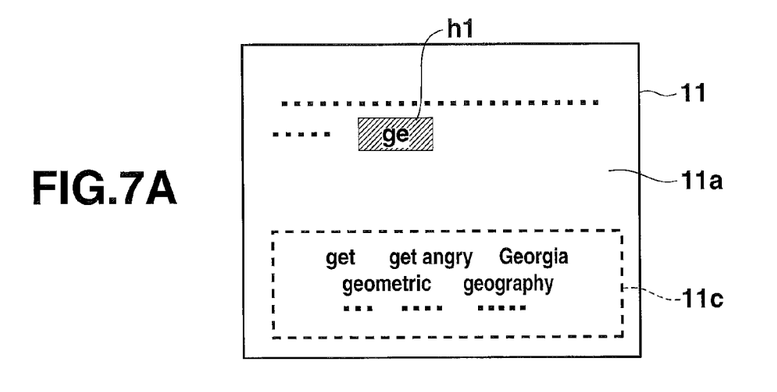
FIG. 7A, FIG. 7B and FIG. 7C are views illustrating a display operation on a character input screen 11a, which is involved in the sentence input process of the tablet terminal 10.
Figure 7B:
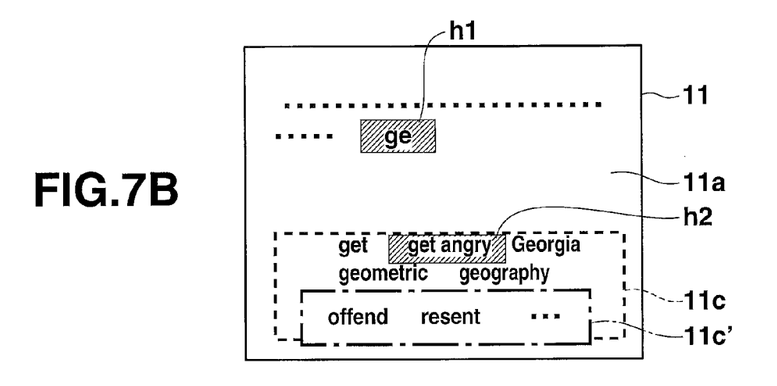
Figure 7C:
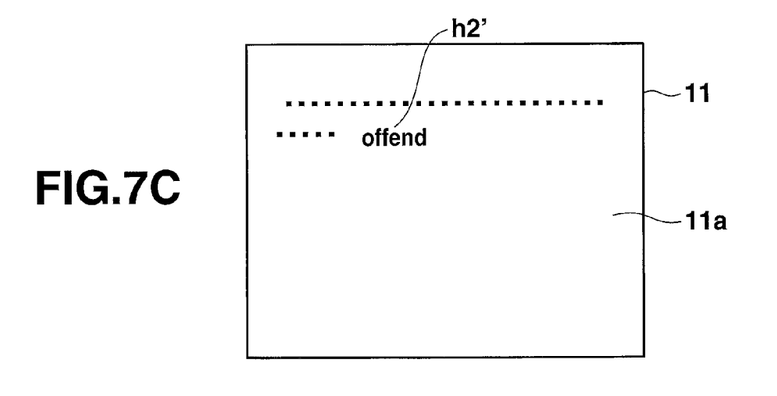

FIG. 7A, FIG. 7B and FIG. 7C are views illustrating a display operation on the character input screen 11a, which is involved in the sentence input process of the tablet terminal 10.

If a character input process for inputting a sentence has been started in association with the execution of an arbitrary application program, the keyboard 11b is displayed, as illustrated in FIG. 1.

If a touch operation is performed on the keyboard 11b and characters "g" and "e" are input, for example, as illustrated in FIG. 7A (step S1), a character string "ge" is displayed as an unfinalized character string h1 on the character input screen 11a. At this time, words "get", "get angry", "Georgia", "geometric", "geography", . . . of conversion candidates are searched from the dictionary database 13b and conversion history database 13c in accordance with the input characters (step S2), and are displayed on the candidate display area 11c in a list form as prediction conversion words (step S3).

For example, even when a word which the user wishes to input, among the words of conversion candidates displayed in the list form, is "get angry", there is a case in which the user wishes to find a word of other wording. In such a case, as illustrated in FIG. 7B, the word "get angry" is designated by a single touch and identification display h2 is effected (step S4 (Yes)), it is determined whether there are synonyms corresponding to the designated word, based on the synonym conversion table 13d (step S5).

In this case, if it is determined that there are synonyms "offend", "resent", . . . , which correspond to the designated word "get angry", based on the synonym conversion table 13d (see FIG. 4) (step S5 (Yes)), these synonyms are read out and displayed in a list form in a synonym display area 11c' which is displayed in a window in the candidate display area 11c (step S6).

If "offend" h2' is selected by a double-touch from among the synonyms displayed in the list form (step S7 (Yes)), the selected synonym "offend" h2' is displayed, as illustrated in FIG. 7C, in place of the unfinalized characters h1 "ge" displayed on the character input screen 11a (step S8).

At this time, the candidate display area 11c and synonym display area 11c' are deleted from the character input screen 11a.

Then, the selected synonym "offend" is registered in the conversion history database 13c (see FIG. 3), and the number of times of selection thereof is newly set, or updated and set (step S9).

On the other hand, as illustrated in the above-described FIG. 7A, if a desired conversion-candidate word "get angry" has been double-touched and selected from among the candidate words displayed in the candidate display area 11c (step S10 (Yes)), the selected word "get angry" is input and displayed in place of the characters "ge" in the sentence displayed as the unfinalized characters h1 on the character input screen 11a (step S11).

Then, the selected word "get angry" is registered in the conversion history database 13c (see FIG. 3), and the number of times of selection thereof is updated (step S12).

In the meantime, if an additional character is input from the state illustrated in FIG. 7A, words of new conversion candidates are searched and displayed in a list form, with the additional character being included in the unfinalized characters h1 (step S4 (No)→S10 (No)→S1~S3).

Thus, according to the character conversion function of the tablet terminal 10, if a word, which the user wishes to input, is input in units of a character from the input keyboard 11b, the words of conversion candidates corresponding to the input character (unfinalized character h1) are displayed in the list form. Then, if one of the words of conversion candidates displayed in the list form is designated by a single touch, synonyms corresponding to the designated word are displayed in a list form. If a synonym h2', which the user wishes to input, is selected from among the synonyms displayed in the list form, the synonym h2' is displayed in place of the unfinalized characters h1.

Thus, when prediction conversion is executed in response to a character input, since synonyms are also displayed as conversion candidates, the range of selection of words at a time of creating a sentence is increased, and the degree of freedom of expression can be enhanced.

In addition, according to the tablet terminal 10, the conversion history data in the past character input is stored, synonyms are acquired from the external electronic dictionary 20 or synonym dictionary server 30 with respect to words with a large number of times of use as targets, and the synonym conversion table 13d is generated.

Therefore, in the tablet terminal 10, synonyms corresponding to words with a history of use can be acquired and utilized, without incorporating a synonym dictionary with a large volume of data in the dictionary database 13b.

Incidentally, the methods of the respective processes and databases of the tablet terminal 10 of the character input system described in each of the embodiments, that is, the respective methods of the synonym acquisition process illustrated in the flowchart of FIG. 5, which are executed by accessing the synonym dictionary server 30 (or electronic dictionary 20) from the tablet terminal 10, and the sentence input process illustrated in the flowchart of FIG. 6, and the databases including the dictionary database 13b, can all be stored as computer-executable programs in the external storage medium 14 such as a memory card (ROM card, RAM card, etc.), a magnetic disk (floppy disk, hard disk, etc.) or a semiconductor memory, and can be distributed. In addition, the computer of the electronic device including the touch-panel-equipped display module 11 reads the program stored in the external storage medium 14 into the storage device 13, and the operation is controlled by this read-in program. Thereby, it is possible to realize the synonym acquisition function and the sentence input function that is capable of executing prediction conversion of synonyms, which have been described in the embodiments, and to execute the same processes by the above-described methods.

In addition, the data of the program for realizing each of the above-described methods can be transmitted over the network N in the form of program codes, and this program data is taken into the computer of the electronic device including the touch-panel-equipped display module 11 by the communication module 16 (17). Thereby, it is possible to realize the above-described synonym acquisition function and the sentence input function that is capable of executing prediction conversion of synonyms.

In the meantime, in the above-described embodiment of the character input apparatus, such a configuration is adopted that the sentence input process is executed by the tablet terminal 10 alone, based on the dictionary database 13b, conversion history database 13c and synonym conversion table 13d which are possessed by the tablet terminal 10.

By contrast, such a configuration may be adopted that, with no special function being possessed by the terminal side that is operated by the user, the server apparatus on the network (cloud system) N, which is communicable from the terminal, is made to possess the dictionary database 13b, conversion history database 13c, synonym conversion table 13d or synonym dictionary 30. By the server apparatus, the list 11c of candidate words, which have been searched from the dictionary database 13b in response to a character input on the terminal side, is transmitted to the terminal and is displayed. Then, responding to designation of the candidate word, the list 11c' of synonyms, which have been read out of the synonym conversion table 13d or synonym dictionary 30, is transmitted to the terminal and is displayed.

According to this configuration, even in the case of a terminal having no special function, by accessing the server apparatus, synonyms can also be displayed as conversion candidates in association with the prediction conversion corresponding to a character input, as in each of the above embodiments, and a more appropriate word, which the user wishes to input, can easily be selected and input.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising a processor configured to execute a process of:
   accepting a character input;
   causing a display module to display a character or a character string, which has been input by the character input;
   causing the display module to display a plurality of words which are conversion candidates corresponding to the input character or character string;
   causing the display module to display, responding to designation by a user of a word of the plurality of words which are conversion candidates, at least one synonym corresponding to the designated word; and
   causing the display module to display, responding to selection by the user of a synonym of the displayed at least one synonym, the selected synonym in place of the input character or character string.

2. The electronic device of claim 1, wherein the processor is configured to cause the display module to display, when a word of the plurality of words which are conversion candidates has been selected by the user, the selected word in place of the input character or character string.

3. The electronic device of claim 2, wherein the processor is configured to:
   cause a memory to store, when a word of the plurality of words which are conversion candidates has been selected by the user, the selected word as a conversion history, and store, when a synonym of the displayed plurality of synonyms has been selected by the user, the selected synonym as the conversion history; and
   acquire synonyms corresponding to a word, among the stored word and synonym, a number of times of use of which has reached a predetermined number of times of use, and
   in a case where the processor executes the display of the synonyms, the processor is configured to read out, when a word of the displayed conversion candidates has been designated by the user, synonyms corresponding to the designated word from the acquired synonyms, and to cause the display module to display the read-out synonyms.

4. The electronic device of claim 3, wherein, in a case where the processor executes the display of the synonyms, the processor is configured to cause, when the word of the displayed conversion candidates has been designated by the user, synonyms corresponding to the designated word to be displayed in a window in a display area of the conversion candidates.

5. The electronic device of claim 4, wherein, in a case where the processor executes the display of the candidates, the processor is configured to execute prediction conversion for the input character, and to cause the display module to display words of prediction conversion candidates.

6. The electronic device of claim 3, wherein, in a case where the processor acquires the synonyms, the processor is configured to:
   output the word, among the stored word and synonym stored by the storing of the conversion history, the number of times of use of which has reached the predetermined number of times of use, to an external apparatus including a synonym dictionary database; and
   receive synonyms which the external apparatus has acquired from the synonym database in response to the output of the word to the external apparatus.

7. A character conversion method in an electronic device, comprising:
   a character input step of accepting a character input;
   an input character display step of causing a display module to display a character or a character string, which has been input by the character input step;
   a candidate display step of causing the display module to display a plurality of words which are conversion candidates corresponding to the character or character string input by the character input step;
   a synonym candidate display step of causing the display module to display, responding to designation by a user of a word of the plurality of words of the conversion candidates displayed by the candidate display step, at least one synonym corresponding to the designated word; and
   a synonym display step of causing the display module to display, responding to selection by the user of a synonym of the at least one synonym displayed by the synonym display step, the selected synonym in place of the character or character string displayed by the input character display step.

8. The character conversion method of claim 7, further comprising a conversion word display step of causing the display module to display, when a word of the plurality of words of the conversion candidates displayed by the candidate display step has been selected by the user, the selected word in place of the character or character string displayed by the input character display step.

9. The character conversion method of claim 8, further comprising:
   a conversion history storing step of storing, when a word of the plurality of words of the conversion candidates displayed by the candidate display step has been selected by the user, the selected word as a conversion history, and storing, when a synonym of the synonyms displayed by the synonym display step has been selected by the user, the selected synonym as the conversion history; and
   a synonym acquisition step of acquiring synonyms corresponding to a word, among the word and synonym stored by the conversion history storing step, a number of times of use of which has reached a predetermined number of times of use,
   wherein the synonym display step includes reading out, when the word of the conversion candidates displayed by the candidate display step has been designated by the user, synonyms corresponding to the designated word from the synonyms acquired by the synonym acquisition step, and causing the display module to display the read-out synonyms.

10. The character conversion method of claim 9, wherein the synonym display step includes causing, when the word of the conversion candidates displayed by the candidate display step has been designated by the user, synonyms corresponding to the designated word to be displayed in a window in a display area of the conversion candidates.

11. The character conversion method of claim 10, wherein the candidate display step includes executing prediction conversion for the input character, and causing the display module to display words of prediction conversion candidates.

12. The character conversion method of claim 9, wherein the synonym acquisition step includes:
   an external output step of outputting the word, among the stored word and synonym stored by the conversion history storing step, the number of times of use of which has reached the predetermined number of times of use, to an external apparatus including a synonym dictionary database; and a receiving step of receiving synonyms which the external apparatus has acquired from the synonym database in response to the output of the external output step.

13. A non-transitory computer readable storage medium having stored therein instructions, which when executed by a device, cause the device to:

accept a character input;

cause a display module to display a character or a character string, which has been input by the character input;

cause the display module to display a plurality of words which are conversion candidates corresponding to the input character or character string;

cause the display module to display, responding to designation by a user of a word of the plurality of words which are conversion candidates, at least one synonym corresponding to the designated word; and cause the display module to display, responding to selection by the user of a synonym of the displayed at least one synonym, the selected synonym in place of the input character or character string.

14. The storage medium of claim 13, including an instruction causing the device to cause the display module to display, when a word of the plurality of words which are conversion candidates has been selected by the user, the selected word in place of the input character or character string.

15. The storage medium of claim 14, including instructions causing the device to:

cause a memory to store, when a word of the plurality of words which are conversion candidates has been selected by the user, the selected word as a conversion history, and store, when a synonym of the displayed synonyms has been selected by the user, the selected synonym as the conversion history; and acquire synonyms corresponding to a word, among the stored word and synonym, a number of times of use of which has reached a predetermined number of times of use, wherein, in a case where the display of the synonyms is executed, when the word of the displayed conversion candidates has been designated by the user, synonyms corresponding to the designated word are read out from the acquired synonyms, and the display module is caused to display the read-out synonyms.

16. The storage medium of claim 15, wherein, in a case where the display of the synonyms is executed, when the word of the displayed conversion candidates has been designated by the user, synonyms corresponding to the designated word are displayed in a window in a display area of the conversion candidates.

17. The storage medium of claim 16, wherein, in a case where the display of the candidates is executed, prediction conversion for the input character is executed, and the display module is caused to display words of prediction conversion candidates.

18. The storage medium of claim 15, wherein, in a case where the synonyms are acquired, the word, among the stored word and synonym stored by the storing of the conversion history, the number of times of use of which has reached the predetermined number of times of use, is output to an external apparatus including a synonym dictionary database, and synonyms, which the external apparatus has acquired from the synonym database in response to the output of the word to the external apparatus, are received.

* * * * *